Aug. 2, 1966    P. E. HYDE    3,263,616
LIQUID RHEOSTAT
Filed Dec. 16, 1963
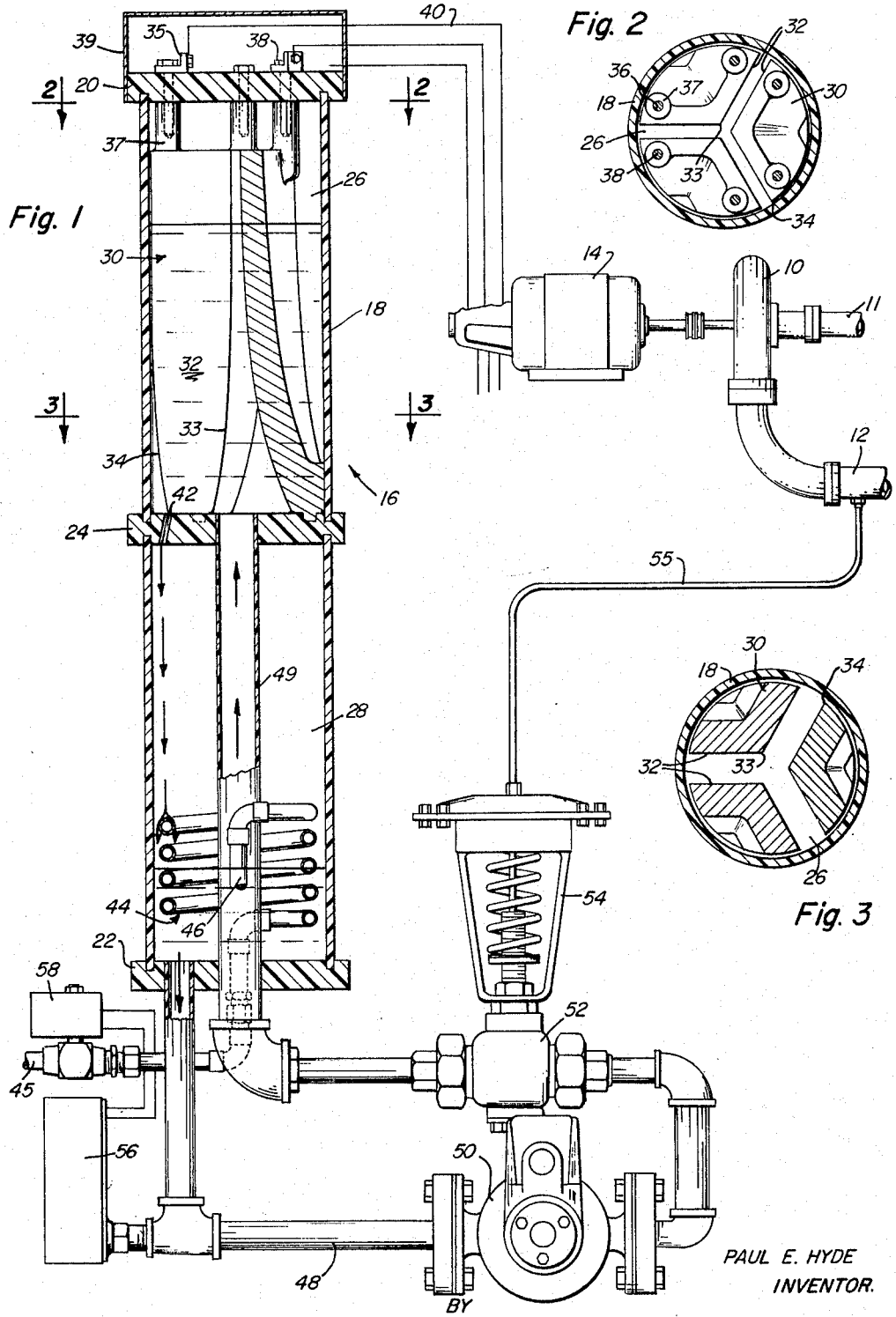
PAUL E. HYDE
INVENTOR.
BY
BUCKHORN, BLORE, KLARQUIST & SPARKMAN
ATTORNEYS

United States Patent Office 3,263,616
Patented August 2, 1966

3,263,616
LIQUID RHEOSTAT
Paul E. Hyde, Corvallis, Oreg., assignor to General Services Company, Corvallis, Oreg., a corporation of Oregon
Filed Dec. 16, 1963, Ser. No. 330,865
6 Claims. (Cl. 103—35)

The present invention relates to an arrangement for controlling the speed of an electric motor and more particularly to a recirculating liquid rheostat for controlling the speed of a motor in response to variations in demand on such motor by the system in which the motor operates.

A primary object of the present invention is to provide a new and improved recirculating liquid rheostat for controlling the speed of an electric motor.

A more specific object of the invention is to provide a new and improved liquid rheostat in which the flow rate of electrolyte may be accurately controlled and easily determined.

Another object of the invention is to provide a new and improved liquid rheostat in which the electrolyte is cooled regardless of the flow rate of electrolyte through the system.

Still another object of the invention is to provide a new and improved liquid rheostat control system of unusual compactness and having a simplified arrangement of elements for ease in installation and reliable operation.

A further object of the invention is to provide a new and improved electrode assembly for a liquid rheostat, which provides for a uniform distribution of current across the opposed faces of the electrodes together with a logarithmic variation in resistance relative to the height of liquid in the rheostat.

In furtherance of the above objects and in accordance with the illustrated embodiment of the invention, the rheostat includes a vertical tubular housing partitioned transversely into an upper, electrode chamber with electrodes therein connected to a variable speed motor in a system subjecting the motor to varying demands, and a lower, electrolyte chamber, with a drain orifice of predetermined, fixed size provided between the two chambers. A cooling coil within the lower chamber is positioned to cool electrolyte as the latter descends by gravity flow from the upper chamber to the base of the lower chamber. A recirculation line connects the upper and lower chambers and includes an external section in communication with the base of the lower chamber and an internal section which extends coaxially through the lower chamber into communication with the base of the upper chamber. A circulation pump in the external section of the recirculation line returns electrolyte from the lower to the upper chamber, and a control valve means in the line on the discharge side of the pump regulates the flow rate of electrolyte through the line in response to the varying demands of the system. The valve means is controlled so that an increase in demand in the system results in an increased flow rate of electrolyte through the recirculation line into the electrode chamber, thereby raising the level of electrolyte and thus reducing resistance in such chamber whereby the speed of the motor is increased. A reduced demand in the system has the converse effect, increasing resistance in the electrode chamber and thereby reducing motor speed.

The foregoing and other objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawings, FIG. 1 is a side elevational view of a liquid rheostat in accordance with the invention showing portions thereof in section for clarity, and including a diagrammatic representation of a typical fluid system incorporating the rheostat. FIG. 2 is a cross sectional view through the electrode chamber taken along the line 2—2 of FIG. 1; and FIG. 3 is a cross sectional view taken along the line 3—3 of FIG. 1.

With reference to FIG. 1, a typical fluid system in which the invention may be used to advantage includes a pump 10 having an intake line 11 connected to a suitable supply source and a discharge line 12 through which it may be desired to distribute fluid at a constant pressure. A variable speed electric motor 14, such as, for example, a wound rotor induction type, is provided to drive the pump 10 at a speed in accordance with the demands of the system. The illustrative system might be utilized, for example, to distribute water to multiple users at a constant pressure regardless of the varying demands for water from the system.

In accordance with the invention a liquid rheostat, indicated generally at 16, is connected across the rotor windings of the motor 14 in a well-known manner, whereby the speed of the motor may be varied by varying the liquid level and thus the resistance in the electrode chamber of such rheostat. The rheostat 16 includes a columnar, generally vertically disposed housing 18 including a top wall 20, and a bottom wall, or base 22. The housing may be constructed of, for example, reinforced plastic or any other suitable dielectric material and may be of any cross sectional shape, although a cylindrical shape is preferred for most uses. The housing is divided transversely by a partition 24 into an upper, electrode chamber 26 and a lower, electrolyte reservoir 28. Fixedly mounted within the electrode chamber 26 are three electrodes 30 which extend generally vertically from the partition 24 to the top wall 20.

As most clearly shown in FIGS. 2 and 3, three identical electrodes 30 are symmetrically arranged about the vertical axis of the chamber 18 and each electrode is also symmetrical about its longitudinal median plane. Each electrode includes a pair of wings defining identical, longitudinally curvilinear outer surfaces 32 which intersect along a corner 33 at an included angle of about 120° to define a generally wedge-shaped electrode body, with each surface 32 decreasing in width from its upper end to its lower end. Each surface 32 of one electrode faces a corresponding surface 32 of an adjacent electrode, and because of their curvilinear nature, the facing surfaces 32 diverge gradually but at an ever increasing rate from the upper portions to the lower portions of the electrodes. Preferably the surfaces 32 follow a logarithmic curve so that the distance between facing surfaces increases logarithmically in a downward direction. Thus, with a variation in the level of electrolyte in the chamber 26 the resistance in the rotor circuit of the motor 14 will vary logarithmically also, giving more immediate and effective control of pressure changes in the controlled system.

As viewed in a vertical plane, the upper portions of facing surfaces 32 are parallel or very nearly so to minimize slip of a motor controlled thereby when the motor is operating at substantially full speed. As viewed in horizontal cross section (FIGS. 2 and 3), the facing surfaces 32 of adjacent electrodes are flat and parallel to one another whereby the perpendicular distance between such surfaces 32 remains constant from the inner corner 33 to the radially outer edge 34 in any given cross section. Thus at any electrolyte level current distribution is substantially uniform across the faces of the electrodes from the inner corner 33 to the outer edge 34 of each, thereby minimizing erosion of the electrodes due to high current concentrations.

Terminals 35 are connected through the top wall 20 into suitable bores 36 in the upper, projecting end portions 37 of the electrodes by suitable current conducting pins 38. A protective cover 39 preferably extends over the terminals which may be suitably connected by leads 40 to the rotor windings of the motor 14.

The electrode chamber 26 is filled with electrolyte to a level which varies dependent upon the desired speed of the motor 14, the higher such level, the lower the resistance and hence the higher the speed of the motor. Means are provided for varying the level of electrolyte in the electrode chamber. These means include one or more drain orifices 42 of fixed diameter in the partition 24, through which electrolyte drains by gravity flow from the electrode chamber and discharges into the upper end of the electrolyte reservoir 28. A cooling means is also provided for cooling the electrolyte after it drains from the electrode chamber 30. The illustrated means includes a cooling coil 44 arranged coaxially within the electrolyte reservoir 28 for conducting a suitable coolant, such as cold water, through the reservoir. The coil is connected to an inflow line 45 and an outflow line 46 which extend through the base 22 to a suitable coolant supply source. The orifice 42 opens into the reservoir 28 at a position vertically above the individual turns of the coil 44 whereby electrolyte descending from the orifice to the bottom of the reservoir necessarily passes over the turns of the coil. Thus electrolyte at a high temperature discharged from the electrode chamber is cooled immediately after leaving such chamber regardless of whether electrolyte in the lower reservoir 28 is at a depth sufficient to cover the cooling coils 44.

A recirculation line connects the electrolyte reservoir 28 and the electrode chamber 26 for returning electrolyte to the latter and includes an external line section 48 which extends in a loop from a position adjacent the periphery of the base 22 of the reservoir 28 outside the housing 18 and thence back to the center of the base 22. An internal line section 49 of the same line is a continuation of the external line section and extends upwardly, coaxially through the base 22, reservoir 28, coil 44 and partition 24 into communication with the upper, electrode chamber 26.

A constant speed circulation pump 50 is installed in the external loop portion 48 of the recirculation line for pumping electrolyte from the reservoir 28 to the electrode chamber 26. Control valve means for regulating the rate of flow of electrolyte from the reservoir 28 to the electrode chamber 26 and thus the level of electrolyte in the upper chamber in response to variations in demand on the pump 10 is provided in the external line section 48 on the discharge side of the circulation pump 50. Such means includes a valve 52 and an associated pressure responsive valve operating means 54 operatively connected by a suitable line 55 to the discharge line 12 for sensing changes in fluid pressure in the pump discharge line 12 and regulating the flow of fluid through the valve 52 in response to such changes.

The valve-operating means 54 may be, for example, the pressure-sensitive diaphragm type valve control device shown, which is of a standard manufacture well known in the art, and which is mounted directly on the valve 52, although other valve-operating means may be used which may be mounted remotely with respect to the valve 52 and connected to the latter by suitable connecting means.

An important advantage in providing the control valve 52 in the recirculation line and specifically on the discharge side of the pump 50 is that the highest fluid pressures are developed in this portion of the electrolyte circuit whereby a relatively small control valve can be used to regulate the level of electrolyte in the electrode chamber. Also the exact flow of electrolyte through the system can be easily determined and accurately controlled with the control valve in this position since the flow will always be a function only of the depth of electrolyte in the electrode chamber and the size of the orifices 42.

It is also desirable to include a shut-off valve means in the coolant circuit and temperature responsive valve-operating means in the electrolyte circuit whereby the circulation of coolant through the cooling coil 44 occurs only when the temperature of the electrolyte in the system exceeds a predetermined desired level. In the illustrated embodiment of FIG. 1, such means include a temperature responsive switch 56 in the external loop 48 of the recirculation line, which is operatively connected to a solenoid valve 58 in the inflow line portion 45 of the coolant circuit, so as to actuate the valve 58 and thereby permit coolant to flow through the cooling coil 44 when the temperature of the electrolyte in the recirculation line exceeds the desired predetermined upper limit.

In operation, the control valve 52 and valve-operating means 54 are adjusted so that when the fluid in the discharge line 12 is at a desired, constant pressure the rate of flow of electrolyte into the electrode chamber 26 equals the rate of outflow from such chamber, whereby the electrolyte level therein remains constant. However, when fluid pressure in the discharge line 12 rises, the change is sensed by the valve-operating means 54, which in response closes the control valve 52 enough to reduce the electrolyte inflow rate below the outflow rate of electrolyte through the orifice 42, resulting in a lowering of the level of electrolyte in the chamber and a consequential increase in resistance in the rotor of the electric motor 14. This, of course, reduces the speed of the motor, and thus the pump 10 which, in turn, reduces the pressure in the discharge line 12. Conversely, when pressure in the discharge line 12 drops, the reverse occurs to raise the level of electrolyte in the chamber 26, lower resistance and increase the speed of the motor 14 and pump 10.

Having illustrated and described a preferred embodiment of the invention, it should be apparent to those skilled in the art that the invention permits of modification in arrangement and detail. I claim as my invention all such modifications as come within the true spirit and scope of the following claims:

1. A recirculating liquid rheostat for controlling the speed of a variable speed electric motor in response to changes in demand on said motor,
  said rheostat comprising in combination:
  (a) a housing of dielectric material defining an electrode chamber, a plurality of electrodes, means mounting said electrodes within said chamber in direct confrontation with one another so that electrical current can flow directly between said electrodes solely through an electrolyte disposed therebetween,
  (b) an electrolyte reservoir beneath said electrode chamber,
  (c) constant diameter drain means in said electrode chamber for discharging electrolyte into said reservoir,
  (d) a recirculation line connecting said reservoir to said electrode chamber,
  (e) constant speed pump means in said recirculation line for returning electrolyte from said reservoir to said electrode chamber,
  (f) and control valve means in said recirculation line between said pump means and said electrode chamber responsive to variations in demand on said motor for regulating the flow rate of electrolyte through said line.

2. A recirculating liquid rheostat for controlling the speed of an electric motor-driven pump in a fluid system in response to pressure changes in said system,
  said rheostat comprising in combination:
  (a) an electrode chamber, including electrodes positioned within said chamber, and means for connecting said electrodes to said electric motor, (b) an electrolyte reservoir beneath said electrode chamber, (c) drain means in the bottom of said electrode chamber for discharging electrolyte into said reservoir, (d) electrolyte cooling means within said reservoir, (e) a recirculation line for returning electrolyte from said reservoir to said electrode chamber, (f) a portion of said recirculation line passing upwardly through said reservoir in proximity to said cooling means and thence into communication with the bottom of said electrode chamber, (g) constant speed pump means in said recirculation line for pumping electrolyte from said reservoir to said chamber, (h) and valve means in said recirculation line on the discharge side of said pump means for controlling the rate of flow of electrolyte therethrough, (i) said valve means including pressure responsive valve operating means for detecting changes in pressure in said fluid system and adjusting the rate of flow through said valve means in response to said changes.

3. A recirculating liquid rheostat for controlling the speed of an electric motor-driven pump in a fluid system in response to pressure changes in said system, said rheostat comprising in combination:

(a) an elongate vertical housing, including sidewall and top and bottom wall portions, (b) said housing being transversely partitioned to form an upper, electrode chamber and a lower, electrolyte reservoir, (c) electrodes positioned within said electrode chamber, including means for operatively connecting said electrodes to said electric motor, (d) orifice means operatively connecting said electrode chamber and said reservoir for draining electrolyte from the bottom of said electrode chamber into the top of said reservoir, (e) electrolyte cooling means within said reservoir, said cooling means being so positioned relative to said orifice means that electrolyte discharged into said lower chamber engages said cooling means when passing from the top to the bottom of said reservoir, (f) a recirculation line connecting said chamber and said reservoir for conducting electrolyte from said reservoir to said chamber, (g) said recirculation line including an external line portion in communication with said reservoir external to said housing and internal line portion extending from said first line portion and passing upwardly through said reservoir into communication with said electrode chamber, (h) constant speed pump means in said first line portion for pumping electrolyte from said reservoir to said electrode chamber, (i) and pressure responsive valve means in said first line portion on the discharge side of said pump means for adjusting the flow rate of electrolyte through said recirculation line in response to pressure changes in said system.

4. A recirculating liquid rheostat for controlling the speed of an electric motor-driven pump in a fluid system in response to pressure changes in said system, said rheostat comprising in combination:

(a) an elongate vertical housing, including sidewall and top and bottom wall portions, (b) partition means within said housing intermediate said top and bottom walls dividing said housing transversely into two chambers, (c) said chambers including an upper, electrode chamber and a lower, electrolyte reservoir, (d) electrodes within said electrode chamber and means for connecting said electrodes to said motor, (e) an electrolyte cooling coil within said reservoir adjacent the lower end thereof, said coil having a vertically extending axis substantially coincident with the vertical axis of said reservoir, (f) said partition means having an orifice of predetermined diameter extending therethrough for draining electrolyte from said electrode chamber into said electrolyte reservoir, (g) said orifice being positioned so as to open into said electrolyte reservoir vertically above the tubing of said cooling coil so that electrolyte passing from the top to the bottom of said reservoir passes over said coil, (h) a recirculation line for conducting electrolyte from said reservoir to said electrode chamber, said line including an internal line portion extending vertically upwardly, centrally through said reservoir, said cooling coil and said partition means, (i) a constant speed pump means in said recirculation line external to said housing for returning electrolyte to said electrode chamber, (j) valve means in said recirculation line between said pump means and said electrode chamber for regulating the flow rate through said line, (k) and pressure responsive valve-operating means for sensing pressure changes in said fluid system and controlling the size of valve opening in response to said changes.

5. A fluid system including (a) pump means for circulating fluid in said system, (b) a variable speed electric motor for driving said pump means, (c) a liquid rheostat for controlling the speed of said electric motor, (d) said rheostat comprising:

(e) a vertically disposed columnar housing, (f) partitioning means dividing said housing transversely into two chambers, an upper, electrode chamber and a lower, electrolyte reservoir, (g) electrodes within said electrode chamber and means connecting said electrodes to said motor, (h) a cooling coil within said reservoir, said coil being substantially coaxial with said reservoir, (i) said partitioning means having an orifice of predetermined diameter extending therethrough for discharging electrolyte from said electrode chamber into said reservoir, (j) said orifice opening into said reservoir vertically above said coil so that electrolyte passing by gravity from said orifice to the bottom of said reservoir passes over said coil, (k) a recirculation line for conducting electrolyte from said reservoir to said electrode chamber, (l) said recirculation line including an external line portion outside of said housing extending from the bottom of said reservoir and an internal line portion extending vertically upwardly coaxially through said reservoir, said coil and said partition means into communication with said electrode chamber, (m) constant speed pump means in said external line portion for pumping electrolyte from said reservoir to said electrode chamber, (n) valve means in said external line portion on the discharge side of said pump means for regulating the rate of flow through said recirculation line, (o) pressure sensitive valve-operating means in association with said valve means, said valve-operating means being operatively connected in said fluid system for detecting changes in fluid pressure in said system and adjusting the rate of flow through said valve means in response to said changes.

6. A fluid system in accordance with claim 4 including shut-off valve means in operative association with said cooling coil, including valve-operating means in the electrolyte circuit responsive to temperature changes of said electrolyte for allowing coolant to flow through said coils.

References Cited by the Examiner

UNITED STATES PATENTS

| | | | |
|---|---|---|---|
| 383,345 | 5/1888 | Crouch | 338—86 |
| 963,163 | 7/1910 | Mackintosh | 338—86 |
| 1,061,689 | 5/1913 | Rice | 230—12 |
| 1,166,157 | 12/1915 | Simmon | 338—86 |
| 1,268,666 | 6/1918 | Archibald et al. | 338—80 |
| 1,309,802 | 7/1919 | Holthoff | 338—86 |
| 1,332,167 | 2/1920 | De Wein | 338—86 |
| 1,654,394 | 12/1927 | Whittaker | 338—86 |
| 1,910,202 | 5/1933 | Crago | 103—35 |
| 2,602,125 | 7/1952 | Crawford | 338—86 |
| 3,021,789 | 2/1962 | Ryden | 103—35 |
| 3,115,613 | 12/1963 | Evans | 338—80 |
| 3,123,005 | 3/1964 | Bredehoeft et al. | 103—35 |

FOREIGN PATENTS

| | | |
|---|---|---|
| 612,121 | 4/1935 | Germany. |
| 290,767 | 5/1928 | Great Britain. |

LAURENCE V. EFNER, *Primary Examiner.*

ANTHONY BARTIS, *Examiner.*